United States Patent [19]

Crayford

[11] Patent Number: 5,673,254
[45] Date of Patent: Sep. 30, 1997

[54] ENHANCEMENTS TO 802.3 MEDIA ACCESS CONTROL AND ASSOCIATED SIGNALING SCHEMES FOR ETHERNET SWITCHING

[75] Inventor: Ian Crayford, San Jose, Calif.

[73] Assignee: Advanced Micro Devices Inc., Sunnyvale, Calif.

[21] Appl. No.: 483,501

[22] Filed: Jun. 7, 1995

[51] Int. Cl.[6] .............................. H04L 5/14; H04L 12/413
[52] U.S. Cl. ........................ 370/231; 370/236; 370/276; 370/446; 370/465
[58] Field of Search .................... 370/24, 26, 31, 370/32, 58.2, 58.3, 60, 79, 85.2, 85.3, 85.6, 85.13, 94.1, 110.1, 229, 230, 231, 235, 236, 276, 296, 445, 446, 465

[56] References Cited

U.S. PATENT DOCUMENTS

| | | | |
|---|---|---|---|
| 4,727,537 | 2/1988 | Mchols | 370/85 |
| 5,305,321 | 4/1994 | Crayford | 370/94.1 |
| 5,311,114 | 5/1994 | Sambamurthy et al. | 370/31 |
| 5,355,375 | 10/1994 | Christensen | 370/85.2 |
| 5,436,617 | 7/1995 | Adams et al. | 340/825.4 |
| 5,517,520 | 5/1996 | Chi | 375/212 |
| 5,535,211 | 7/1996 | Yano | 370/85.2 |

FOREIGN PATENT DOCUMENTS

| | | | |
|---|---|---|---|
| 0 529 774 A1 | 3/1993 | European Pat. Off. | H04L 12/46 |
| 0 648 034 A1 | 4/1995 | European Pat. Off. | H04L 12/28 |

OTHER PUBLICATIONS

Melatti, L., "Fast Ethernet: 100 Mbit/s Made Easy," *Data Communications*, vol. 23, No. 16, Nov. 16, Nov. 1, 1994, pp. 111/112, 114, 116.

*Primary Examiner*—Russell W. Blum
*Attorney, Agent, or Firm*—Townsend and Townsend and Crew LLP

[57] ABSTRACT

A flow control enabled Ethernet switch that applies backpressure to input ports that attempt to transmit a data packet to a busy destination port. The backpressure is a phantom packet that activates to abort transmission of the data packet. When the destination port is available, the phantom packets control retransmission, permitting standard retransmission of the data packet. The switch may include prioritization mechanisms to use when awarding priority to a port having backpressure applied.

39 Claims, 5 Drawing Sheets

ENHANCEMENTS TO 802.3 MEDIA ACCESS CONTROL AND ASSOCIATED SIGNALING SCHEMES FOR ETHERNET SWITCHING

CROSS-REFERENCE TO RELATED APPLICATIONS

This application is related to "FLOW CONTROL METHOD AND APPARATUS FOR ETHERNET PACKET SWITCHED HUB," U.S. patent application Ser. No. 08/480,497 filed Jun. 7, 1995, currently pending, "EXPANDABLE PORT MOBILITY FOR NETWORK REPEATER," U.S. patent application Ser. No. 08/409,820 filed Mar. 23, 1995, currently pending, "AUTO NEGOTIATION SYSTEM FOR A COMMUNICATIONS NETWORK," U.S. patent application Ser. No. 08/161,707 filed Dec. 3, 1993 and "ETHERNET MEDIA ACCESS CONTROLLER WITH EXTERNAL ADDRESS DETECTION INTERFACE AND ASSOCIATED METHOD," U.S. Pat. No. 5,305,321, all hereby expressly incorporated by reference for all purposes.

BACKGROUND OF THE INVENTION

The present invention relates generally to data packet switches used in computer local area networks, and more specifically to a method and apparatus for implementing flow control of packets directed to ports of a switch in such a computer network.

Networks of computers are commonly used in today's business environment. One common network system structure uses one or more repeaters. The repeater typically includes several ports. A particular data packet received at one port is retransmitted to the other ports of the repeater. Each repeater restores timing and amplitude degradation of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multi-port repeater located at a center of the star. The repeater performs signal amplitude and timing restoration. The repeater receives a bitstream at one of its ports and restores signal amplitude levels and timing requirements to all appropriate output ports. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is the frame or packet format that is used to pass messages between the participating nodes on the network.

The packet commences with a preamble sequence which is an alternating ("1" and "0") pattern. The preamble sequence provides a single frequency on the network, in this case five MegaHertz (MHz) at the start of each frame, allowing a receiver to acquire and lock onto the associated bitstream. The preamble sequence is followed by a start of frame identifier that immediately precedes the data portion of the transmission. Either a start of frame delimiter (802.3) or synch sequence (Ethernet) delineates the start of the data portion of the message. Following the start of frame identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:

1. Individual

The DA field contains an individual and unique address assigned to a single node on the network.

2. Multicast

When the first bit (LSB) of the DA is set, the remainder of the DA includes a group address. The group of nodes that are actually addressed is determined by a higher layer function. In general, use of a group address is designed to transmit a message to a logically similar subset of nodes on the network.

3. Broadcast

The broadcast is a special form of multicast address wherein the DA field is set to all "1's." This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. The higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

FIG. 1 and FIG. 2 are diagrams illustrating formats for an IEEE 802.3 Standard compliant packet and an Ethernet packet, respectively. Comparing the packet formats illustrates that a primary difference between the packet types is that the start of frame delimiter (SFD) for 802.3 is defined as a byte that has a "1 0 1 0 1 0 1 1" pattern whereas the start frame (synch) of Ethernet is a "11" sequence. Even so, in both cases, a total number of bits for the preamble plus the start of frame indication is sixty-four bits long.

The 802.3 and Ethernet standards both specify that a frame must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters in unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, as networks change in the number of nodes attached thereto, it becomes important to be able to associate an address with a particular port or the like within the network.

To further provide background information, it is useful to consider the concept of a collision domain. A collision domain is a collection of nodes or end stations that collectively access a total bandwidth available when using CSMA/CD protocol. The CSMA/CD system provides a mechanism to detect a collision condition (when more than one device on the network attempts to transmit at the same time).

CSMA/CD devices detect when collisions exist and provide procedures to control the various devices so that one data packet is transmitted at a time within the collision domain. For example, with Ethernet, detection of a collision event causes each end-station that tried to transmit when the collision was detected to implement a back-off algorithm. The back-off selects a period for the particular end-station to wait before trying to transmit again. Since several different values are possible, the interfering end-stations eventually will select different values resulting in one of the end-stations transmitting its data packet.

An additional control mechanism is provided by carrier detection. End-stations are not allowed to transmit packets into their collision domain if another end-station is transmitting into the collision domain. End-stations determine whether another end-station is transmitting by the carrier detection mechanism, as well known.

As computing power and bandwidth needs of the individual end-stations increase, it becomes increasingly easy for a collision domain to become saturated, resulting in inefficient operation of the network and inefficient operation of the end-stations trying to access various resources over the network.

A solution that various network administrators have used in order to reduce network congestion segments end-stations into multiple collision domains. As each domain gets a full allocation of the relevant network bandwidth, the various segmented collision domains have improved operation. For an end-station having particularly high bandwidth requirements, it is possible to segment it into its own collision domain.

Often, the various autonomous collision domains will exchange information. Special devices, such as a switch or bridge, exist in multiple collision domains and route data packets between the various collision domains. In designing these special devices, it is important that they do not significantly degrade the performance of the collision domains that they transfer messages between while efficiently transporting inter-domain packets to the proper destinations. In general, collisions within one collision domain are not propagated to any other collision domain. Only valid packets destined for a destination in another collision domain will be forwarded.

Standards are constantly evolving to improve performance and provide enhancements to existing networks. Some of these standards address implementation of full-duplex communication. As a consequence of the development of these new standards, 802.3/Ethernet networks have several half duplex options, which operate over potentially full duplex media types, such as UTP and fiber. These are:

(i) 10BASE-T

By far the most prevalent version of Ethernet in the current installed base. Requires two pairs (one dedicated for transmit, the other for receive) of Category 3 or better UTP. Suitable for operation over 2 pair, 4 pair and 25 pair bundles.

(ii) 10BASE-F

A popular version of the original 10 Mb/s Ethernet which operates over fiber optic cables, and permits long distance links, immunity from EMI/RFI, and reduced self emission of EMI/RFI. Requires duplex (one dedicated for transmit, the other for receive) 62.5/125 micron multimode fiber. This standard generally supersedes the earlier FOIRL standard, and is hereby expressly incorporated by reference for all purposes.

(iii) 100BASE-T4

A version of 100BASE-T suitable for operation over Cat 3 cable plant. Requires four pairs (two bi-directional transmit/receive, one dedicated for transmit, one dedicated for receive) of Cat 3 or better UTP. Suitable for operation over individual 4 pair cable, but not 25 pair bundles. 100BASE-T4 is not a suitable candidate for 100 Mb/s full duplex operation due to it's requirement to operate on three pairs when transmitting or receiving (the fourth pair is used for collision detection). For additional details, see Clause 23 of the 802.3u Draft Supplement, and is hereby expressly incorporated by reference for all purposes.

(iv) 100BASE-TX

A version of 100BASE-T suitable for operation over Cat 5 cable plant. Requires 2 pairs (one dedicated for transmit, one dedicated for receive) of Cat 5 UTP. Suitable for operation over individual 2 pair cable, but not in bundles. For additional details, see Clause 24 and 25 of the 802.3u Draft Supplement, and is hereby expressly incorporated by reference for all purposes.

(v) 100BASE-FX

A version of 100BASE-TX suitable for operation over fiber optic cables. Requires duplex (one dedicated for transmit, the other for receive) 62.5/125 micron multimode fiber. For additional details, see Clause 24 and 26 of the 802.3u Draft Supplement, and is hereby expressly incorporated by reference for all purposes.

There are two fundamental reasons to offer Full Duplex operation:

(i) Provide simultaneous transmit and receive activity. This effectively doubles the available bandwidth of the half duplex system, and may be useful in multitasking environments (network servers or workstations with multitasking operating systems) and for interactive services (voice or video conferencing).

(ii) Increasing the topology restrictions of the network. This is especially true for networks based on the new "Fast Ethernet" topology, as defined in the IEEE 100BASE-T draft. In this speed enhanced derivative of Ethernet, the network operates at a tenfold increase in data rate (100 Mb/s). However, with this increase in network data rate comes a corresponding reduction in the topology (or span) of the network, leading to network diameters of approximately 200 m. Offering a full duplex capability allows long distance links, such a fiber optic, to be used where the round trip is irrelevant, and only the end-to-end attenuation is important to the distance of the link. Implementing flow control for full-duplex communications is highly desirable especially as data throughput rates increase to speeds that can quickly overwhelm buffer space.

SUMMARY OF THE INVENTION

The present invention provides apparatus and method for simply, efficiently and economically providing flow control in an Ethernet switch having full-duplex, and half-duplex, ports. One advantage of the preferred embodiment is that it can be used in an existing switch implementation which provides multiple input or output buffers. The implementation is able to reduce the number of input/output buffers, while preserving the original data path of the design. Only minimal additional logic is required for the additional functionality to reduce the buffering requirements substantially. The preferred embodiment allows virtually any switch architecture to be accommodated, regardless of whether the switch provides dedicated or shared input/output queue structures, or even whether it is memory based or bus based. In effect, the described mechanisms of the preferred embodiments allow switch optimization according to available buffering and aggregate bandwidth of the switch fabric.

In another advantage of the invention, a switch using flow control can be enhanced to provide excellent performance using substantially less dedicated buffer memory, simplifying the buffering scheme and allowing cost reductions over a switch not providing flow control.

For instance, in an output queued switch, output buffering can be reduced. Flow control indicators are only generated to indicate that no current output buffer exists. In essence, backpressure flow control is generated when no output buffers for the output port are available. Similarly, in an input queued switch, the input buffering can be reduced, and the flow control indicators used to signal that no current input buffer(s) exist. For a time-division multiplexed (TDM) bus based switch, the flow control indicators signal that no currently available slot on the TDM bus is available.

According to one aspect of the invention, it includes a method of switching an input data packet received at a first port of a network switch to a second port of the network switch having a communication channel established between the second port and a third port of the network switch. The preferred embodiment of the invention includes the steps of:

determining whether to block the input data packet; thereafter applying a full-duplex backpressure indicator to the first port when blocking is desired;

responding, by a transmitter coupled to the input of the first port, to the backpressure indicator to abort transmission of the input data packet; thereafter receiving a retransmitted input data packet at the first port when the second port is available; and thereafter routing the input data packet from the first port to the second port.

In summary, two potential implementations are described. The first is based on transmitting a packet to a Full Duplex station, and that station recognizing the packet as one containing flow control information, and taking action on that packet to suspend, stop or slow its future transmission rate. Either an explicit packet containing a message, or a time out which operates within the Full Duplex station, restores the transmission characteristics to their normal, or optimal transmission rate, at a future time. This scheme is optimal for use in existing 10BASE-T and 10BASE-FL (with FOIRL, the most prevalent version of fiber Ethernet) installations, since the same type of flow control packet can be utilized to either alter a full duplex station's transmit characteristics, or to block a half duplex station's transmission attempt due to the creation of a collision condition (simultaneous transmit and receive operation). The disadvantage of this scheme is that by using the reception of the flow control packet at the station, to essentially generate the same condition as a half duplex collision, means that the collision must occur within the normal slot time of 512 bit times (an "in-window" collision). This in turn implies that the topology of the network must be constrained to ensure that the propagation delay of the flow control packet will arrive at all network stations within the slot time. However, for the installed base, this is not an acute problem. Existing 10BASE-T and 10BASE-FL networks are already constrained in topology to ensure that the maximum round trip delay is within 512 bit times, which includes the path through all repeaters. By replacing a repeater with a switch, to enhance bandwidth for instance, each port of the repeater which was previously in the same collision domain, is isolated into its own separate collision domain. In essence, replacing a repeater with a switch therefor reduces the end-to-end delay over the resulting collision domains. If the demands of some end station applications exceed even the sharing of bandwidth with a small workgroup, then a "dedicated Ethernet" approach can be utilized. Dedicated Ethernet is essentially segmentation of the network taken to its logical extreme, where only one end-station is connected to each port of the switch. Since each port can achieve the full 10 Mb/s, each desktop achieves an effective "dedicated" 10 Mb/s. An enhancement to dedicated Ethernet is the use of "Full Duplex Ethernet". This can be used for higher performance and enhanced support for interactive applications, where simultaneous transmit and receive activity is important. However, since most of the installed base of Ethernet end stations only operate in half duplex mode, this almost invariably requires the end station to be upgraded. Notice also that the use of switched Ethernet does not mandate full duplex operation, but the use of full duplex Ethernet mandates the use of a switch.

Full duplex operation at the end station is typically characterized by minor changes to the MAC and Layer Management functions, which are identified below, and well known to those skilled in the art.

| MAC - deference and collision suspension | | |
|---|---|---|
| disable collision | 4.2.8 | disable/modify "procedure WatchForCollision" |
| disable deference | 4.2.8 | disable/modify "process Deference" |
| Layer Management - avoid MIB corruption, add control/status | | |
| disable loopback | 5.2.2.1.2 | disable/modify "Number of carrierSenseErrors" |
| disable SQE Test | 5.2.3.1.1 | disable/modify "Number of SQETestErrors" |
| enable/disable Full Duplex operation (supported by management) | | |
| report Full Duplex operation (supported by management) | | |

The major difference that this invention encompasses, over previous full duplex end-station implementations which allow indiscriminate transmit and receive activity with no mechanism for flow control, is the detection of the flow control packet (which may optionally contain either a special preamble, SFD or a particular data pattern), and the reaction to it, namely invoking a collision on the current transmit packet. Other enhancements, such as increasing the collision slot time when operating in full duplex mode, and providing finer granularity on the transmit performance adjustment of the station (such as lengthening the IPG interval) are also possible, but may result in additional complexity in the implementation, since they diverge more from the original half duplex Ethernet MAC functionality.

Although this first scheme is optimal for the installed 10 Mb/s UTP and fiber installed base, it is also applicable to 100BASE-T4, for flow control in the half duplex mode, and 100BASE-TX/FX stations in either full duplex of half duplex modes.

A second scheme is identified which is optimized to the signaling characteristics of the 100BASE-X implementations, where currently reserved control code-groups are used to transfer flow control information between stations. Again, this can be used in concert with half duplex stations, since these code-groups when received, are interpreted as a "false carrier" indication, indicating the line transitioned from the idle to the non-idle state, but the SSD ("J" code-group followed by the "K" code-group) was not received as the identifier. This leads to a collision condition if the half duplex station is transmitting, so is essentially analogous to the generation of the flow control packet in the 10 Mb/s system (i.e. the station detects simultaneous transmit and receive activity).

This scheme has distinct advantages. The first is that it reduces the changes in the MAC and Reconciliation Sub-layer to a minimum, imposing most of the changes in the PHY. For instance, receipt of the special code-group can be limited to an XON/XOFF protocol, again with an optional background timer removing the need for the explicit XON message. The PHY receives the XOFF message, and generates the collision using the MII COL indication in the normal way. Extensibility is also allowed, by passing other special code-groups during the collision indication as described later, although again, this implies more deviation at the MAC layer from the normal CSMA/CD half duplex version. Since the PHY uses the collision indication, the only necessary MAC modification is to permit transmit activity when receive activity is in progress. This can be simply achieved by using separate transmit and receive carrier sense indications. A receive carrier sense can be derived from the MII RX_DV signal, and a transmit carrier sense signal can be derived from the normal MII CRS signal. Again, this technique is already well known to those skilled in the art.

The second advantage is that it is possible to embed flow control within a normal packet, which can significantly aid the granularity of the flow control. In addition, the topology can be extended, since the PHY can monitor the transmit activity, and only apply the flow control XOFF signal (for instance) when the transmitting MAC is within the slot time. In this manner, the transmitting MAC will detect the "in-window" collision and backoff, scheduling a retry interval as appropriate. If the XOFF indication is received after the slot time has expired, the PHY can delay the collision indication until the next transmitted packet.

Notice that in both schemes, either the IPG and or the slot time can be altered and/or negotiated. For instance, at power up using the Auto-Negotiation protocol (802.3u Clause 28), or dynamically using the packet of code-group contents to modify these parameters.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DESCRIPTION OF THE PREFERRED EMBODIMENT

Figure 1:
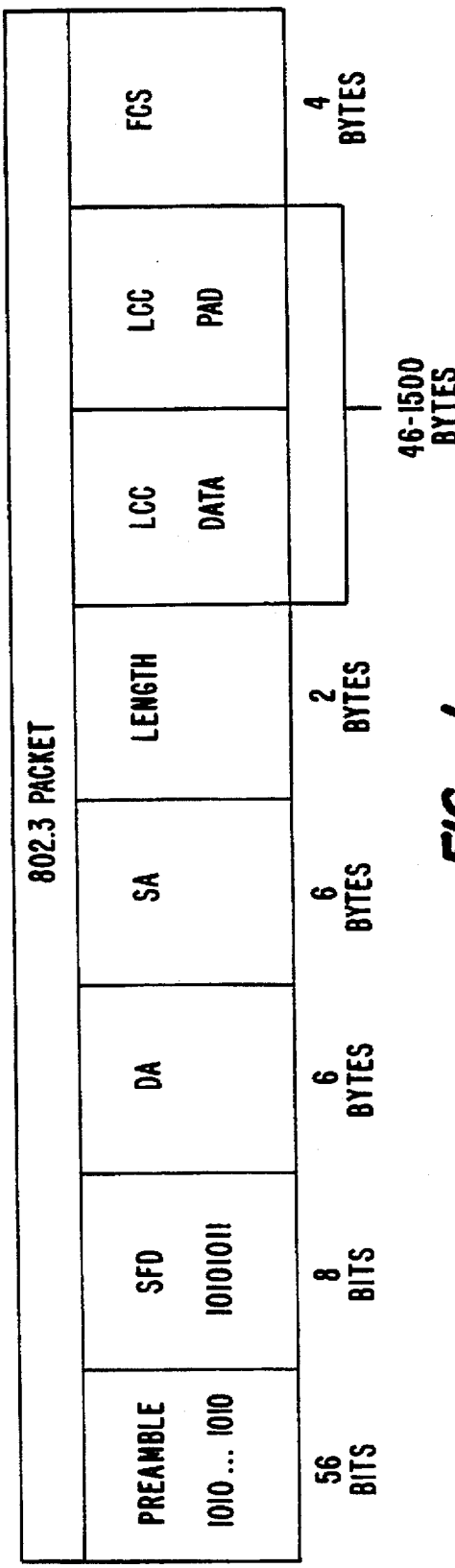
FIG. 1 is a diagram illustrating a format for an IEEE 802.3 Standard compliant packet.
Figure 2:
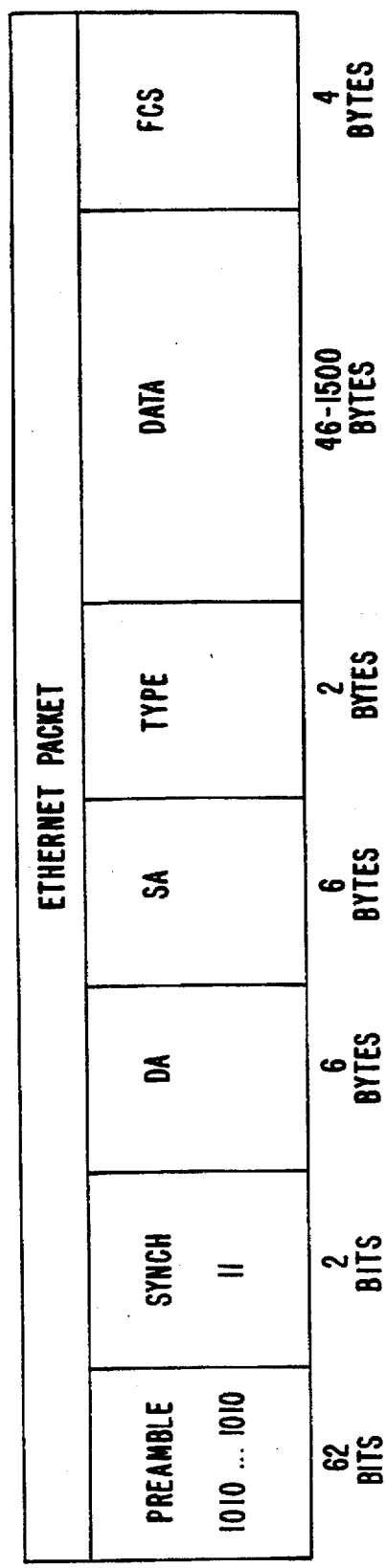
FIG. 2 is a diagram illustrating a format for an Ethernet packet.
Figure 3:
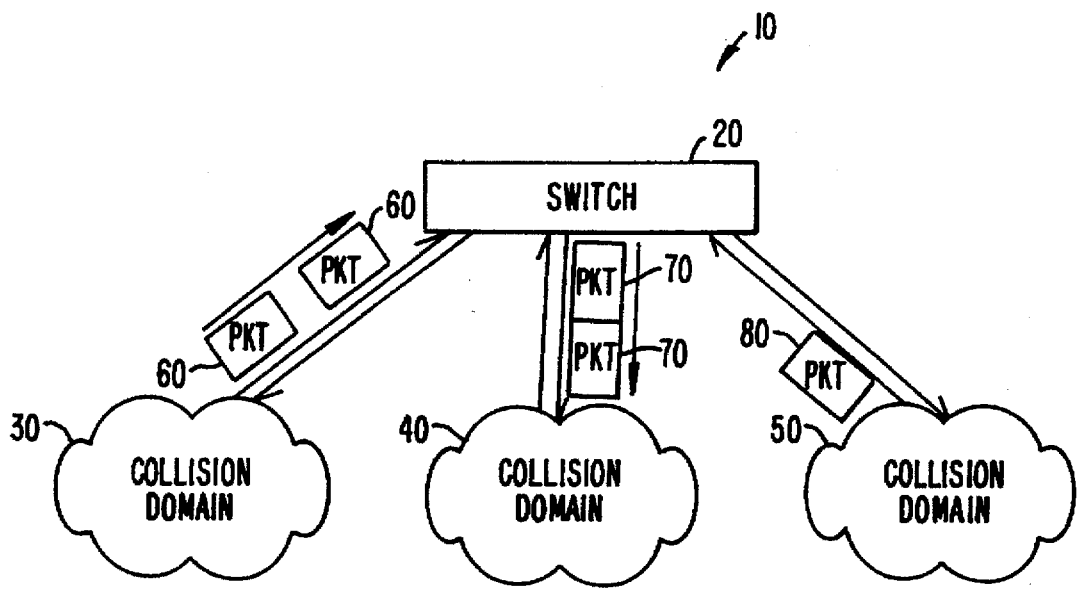
FIG. 3 is a block diagram of a multiple collision domain network having a switch to route inter-domain packets into the proper domain.

FIG. 3 is a block diagram of a multiple collision domain network 10 having a switch 20 to route inter-domain packets into the proper collision domain. Network 10 includes a first domain 30, a second domain 40 and a third domain 50 all coupled to a half-duplex port of switch 20. For purposes of FIG. 3, it is assumed that first domain 30 is transmitting a series of packets 60 to second domain 40 by routing them through switch 20. Switch 20 routes packets 60 into second domain 40 with the packets routed into domain 40 referred to as packets 70. For purposes of the following discussion, the concept of a switch is used in its broadest sense to refer to a inter-collision domain packet routing device, whether called a switch, hub, gateway, router, concentrator, or other term.

Initially, switch 20 sets up a communications channel between first domain 30 and second domain 40 in response to destination address information contained in the destination address field of the incoming packets 60. The process of sending packets from one collision domain into another conforms to the IEEE 802.3 standard. While one of packets 60 is transmitted from first domain 30 into second domain 40 through switch 20, third domain 50 may attempt to transmit a packet 80 into first domain 30 or second domain 40. It is possible for third domain 50 to send packet 80 into one of the other domains while it is transmitting because third domain 50 does not receive information about network activity from the other collision domains.

Upon receiving packet 80, switch 20 determines whether packet 80 is a valid packet and destined for an end-station in a collision domain other than third domain 50. Whenever packet 80 is destined for another collision domain, switch 20 determines whether the desired domain is busy.

To simplify explanation, it is assumed that packet 80 is to be transmitted into second domain 40. If the desired domain is busy when packet 80 is received at switch 20, switch 20 may have some memory available to buffer packet 80 until it can send packet 80 into second domain 40. For a cost-competitive switch however, the amount of buffer memory is necessarily limited and in some circumstances, switch 20 will not be able to buffer packet 80. A conventional switch is unable to adequately control third domain 50 through a flow control mechanism to have third domain 50 suspend transmission of packet 80 into second domain 40. Packet 80 is therefore transmitted and lost. The physical layer of a conventional system must rely on higher level error detection and correction mechanisms to recover from this type of error condition. This can lead to significant performance degradation.

Figure 4:
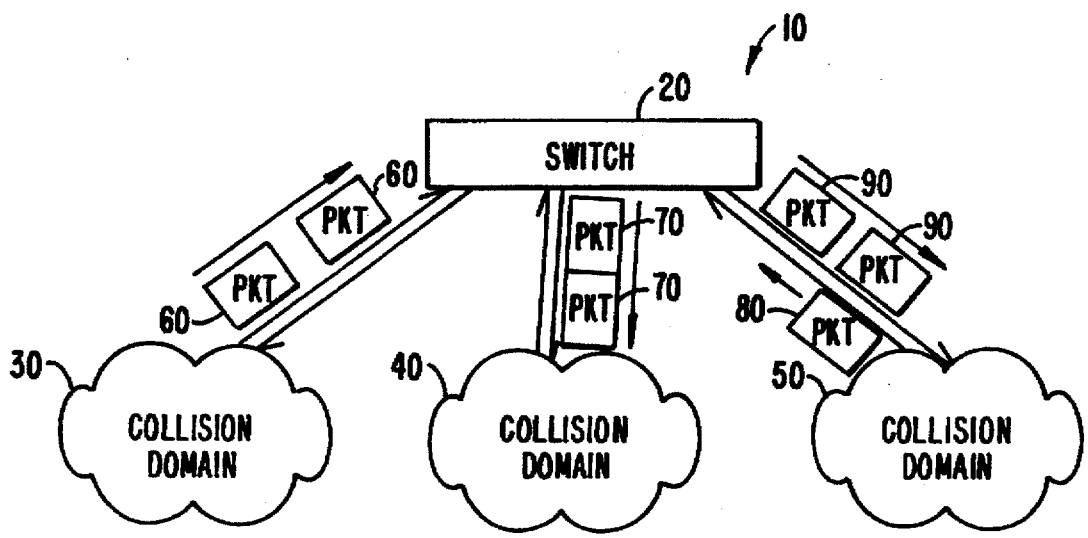
FIG. 4 is a block schematic diagram illustrating application of backpressure to one collision domain when a receiving collision domain is busy.

FIG. 4 is a block schematic diagram illustrating application of backpressure to third domain 50 in response to transmission of packet 80 to a receiving domain that is busy. Switch 20, after determining that packet 80 must be blocked (because switch 20 cannot buffer or forward packet 80 to second domain 40), switch 20 applies backpressure into third domain 50. Backpressure, in the form of a phantom data packet 90 for the preferred embodiment, is sent from switch 20 into third domain 50. Phantom packet 90 may be virtually any type of packet, and is referred to as a phantom packet because, in the preferred embodiment, it is generated by switch 20 and does not otherwise exist in network 10. A requirement for phantom packet 90 is that receipt of phantom packet 90 in third domain 50 while packet 80 is being transmitted to switch 20 triggers a collision condition in third domain 50.

Third domain 50 responds to a collision condition according to IEEE 802.3 that is desirable by either suspending transmission of packet 80 or retransmitting packet 80 in well-known fashion conforming to IEEE Standard 802.3. In the simplest implementation, switch 20 will apply backpressure, in the form of a single phantom packet 90, to third domain 50 every time it detects receipt of packet 80 and needs to block its receipt (e.g., buffering is unavailable and the desired domain is busy). Third domain 50 responds to phantom packet 90 by implementing a back-off algorithm that randomly assigns a delay before third domain 50 is able to reattempt transmission of packet 80. For certain applications, this simple type of flow control will be sufficient.

For other applications, the flow control procedure described above does not provide a complete solution. In some instances, the desired domain may receive a long succession of data packets. Without coordinating when third domain 50 reattempts the transmission of packet 80, there is a low probabilistic chance that packet 80 is received at switch 20 during an inter-packet gap (IPG) of a train of packets 60 transmitted into second domain 40. The standard back-off algorithm decreases the likelihood that packet 80 is received during an IPG in that each subsequent failure to transmit packet 80 without a collision being detected results in increasing delays. The reason that the likelihood decreases is because the back-off algorithm increases the range of possible back-off delays which must elapse prior to the next transmission attempt for each collision on packet 80 caused by phantom packet 90. The IEEE 802.3 Standard only permits sixteen failures (collisions) on a particular transmission attempt before terminating the process and asserting a retry error.

In order to effectively circumvent this limitation, the preferred embodiment does more than simply send a single phantom packet 90 to third domain 50. Switch 20 actually creates a logical collision domain of the three collision domains involved. In other words, switch 20 creates a single logical collision domain by combining first domain 30, second domain 40 and third domain 50. To do this, switch 50 issues a series of phantom packets 90 as a carrier activity signal during the duration of a transmission of data packet 60 from first domain 30. The first of the series of phantom packets 90 initiates the back-off algorithm. The subsequent transmission of phantom packets 90 is detected by third domain 50 as carrier activity, inhibiting third domain 50 from reattempting transmission of packet 80 until the carrier activity ceases. As the carrier activity ceases when the communication channel between first domain 30 and second domain 40 is idle and second domain 40 is able to accept packet 80, third domain 50 has a chance to aggressively contend for access to second domain 40.

The use of the logical collision domain for domains involved in a current transaction and those attempting to enter into communication with one of the involved domains greatly improves flow control and accessibility/performance of network 10 as third domain 50 aggressively contends for second domain 40. In the case where first domain 30 is monopolizing second domain 40, such as with a burst transfer, third domain 50 may still have a difficult time accessing second domain 40. All DTEs in all collision domains each include an IPG counter that controls a minimum gap between transmission of packets. Implementation of the IEEE 802.3 Standard requires that a DTE not begin its IPG counter until after completion of the carrier activity. Therefore, for back-to-back transmissions by first domain 30 to second domain 40, it is possible that access by third domain 50 to second domain 40 is not strictly fair. To improve fairness and to provide enhanced functionality, switch 20 implements a prioritization mechanism to control access of any collision domain to another collision domain.

In the preferred embodiment, this prioritization mechanism includes a plurality of throttle counters (not shown), one for each port. When switch 20 applies backpressure into a collision domain, the throttle counter associated with that collision domain is incremented. The count of the throttle counter is available to switch 20 when determining priority issues. After a successful transmission of packet 80 to second domain 40, switch 20 clears the throttle counter and dismantles the logical collision domain.

To effectively implement the prioritization mechanism, switch 20 asserts backpressure to each collision domain that has a packet destined for a currently busy destination domain until the destination domain is idle. Then switch 20 awards access to the destination domain (second domain 40 in the present example) by relieving the backpressure applied to the collision domain (third domain 50) that has a packet to transmit into the destination domain.

In the preferred embodiment, the throttle count is used when awarding priority. As the throttle count gets closer to the sixteen packet retry limit, awarding access to third domain 50 becomes increasingly urgent. Switch 50 may include other prioritization algorithms that provide enhanced access to certain ports (port number) or end-stations (source address of packet).

In the preferred embodiment, when two input ports become active within a predetermined time, the Throttle Count value is read from the MAC at each associated port, and priority is awarded to the receive port with the highest (or a predetermined) value of Throttle Count. A period for receive packets arriving to be considered effectively simultaneously received can be made programmable, to allow input ports to contend for output ports as late as possible to maximize fairness.

In the preferred embodiment, the start of phantom packet generation is made programmable. Since generation of a phantom packet occurs at a point in the early stages of the packet (at some point within the slot time), this effectively makes the logical span of the collision domain appear larger than its physical span, In effect, the delay in the generation of the phantom collision appears at the sourcing end-station as additional round trip delay. To allow various topologies to be accommodated under the switch port, it is necessary that the start of the phantom packet generation be programmable, although a reasonable default would normally be used. In the event that an extended topology were required, the time to the start of phantom packet generation would be reduced, to avoid potential late collision problems.

The preferred embodiment is able to control the content and/or duration of the phantom packet to enhance robustness of the system. The actual data contained in a phantom packet in a half-duplex implementation is arbitrary. It is desirable, however, that the device receiving a phantom packet not interpret the data as a valid packet. One way of ensuring this is to simply make a phantom packet have only a preamble (alternating "1" and "0"). While such a simple phantom packet may be adequate for link segments (such as 10BASE-T), there is a chance that such a phantom packet is unsuitable for a mixing segment (such as 10BASE2). Thus, for certain applications, the phantom packet should be interpreted as either a runt (the phantom packet must have less than 576 bits including preamble) or that a legal length phantom packet have an invalid CRC value.

In the preferred embodiment, it is an option that the phantom packet have a programmable size. In one mode, phantom packet generation ensures that every generated phantom packet is a runt. Runt packets are naturally rejected by receivers as invalid packets. The phantom packet generation is also programmable to continue a phantom packet for as long as the destination domain is busy.

Thus, the preferred embodiment includes an option of providing a compromise that generates, as backpressure, a phantom packet as a normal preamble sequence for the duration that the destination domain is busy. As a programmable option, the phantom packet is segmented into multiple smaller packets (phantom runts) that are successively transmitted closer together than permitted (i.e., the IPG between two phantom runts is illegally short). This type of backpressure ensures that the device having flow control applied to it first detects a collision, followed by a short period of silence, then before reaching the first part inter-frame spacing (IFS), the receiver detects carrier activity and will back-off. As each phantom runt is rejected by a receiving media access controller (MAC) due to invalid packet size, there is little requirement to create illegal CRC values.

Figure 5:
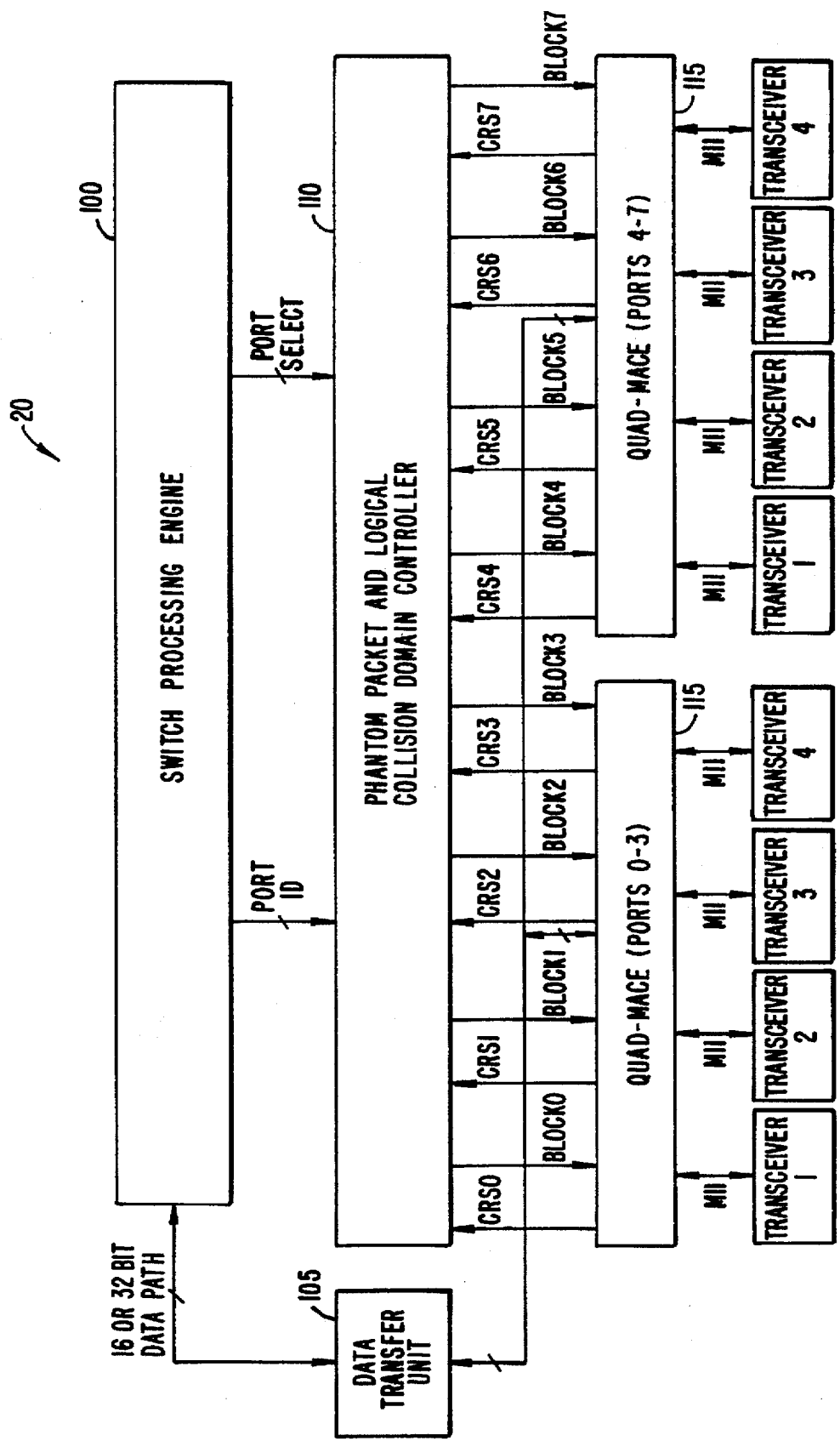
FIG. 5 is a block schematic diagram of a switch incorporating a preferred embodiment of the present invention.

FIG. 5 is a block schematic diagram of switch 20 incorporating a preferred embodiment of the present invention. Switch 20 includes a switch processing engine 100, a data transfer unit 105, a phantom packet and logical collision domain logic 110 and a pair of QUAD integrated Ethernet MAC devices 115 (four MACs per integrated package 115). Switch 20 thus provides an 8 port switch configuration. QUAD MAC 115 is a modified version of the QUAD-MACE chip that is commercially available from Advanced Micro Devices, Inc., of Sunnyvale, Calif., P/N AM79C944. The presently available specification for the QUAD-MACE is hereby expressly incorporated by reference for all purposes.

The QUAD-MACE is modified by adding two pins per port, one output pin (CRSx) that is asserted when the corresponding port x is busy (transmitting or receiving) and an input pin for receiving a BLOCKx signal. When the BLOCKx signal is asserted, port x asserts backpressure for as long as the BLOCKx signal remains asserted.

When a packet is received at port x, switch processing engine 100 reads the start of the incoming packet from port x of the appropriate MAC 115. If, after performing a look-up to determine the physical destination port, port y, the determination is that port y is already busy, the switch processing engine 100 writes the active input port as a 3-bit PORT ID code, to the logical collision domain controller of the appropriate output port y. The logical collision domain controller is selected using the 3-bit PORT SELECT code. Each port has an associated 3-to-8 line decoder (See FIG. 6 below). When the Port ID is written out, a CRS output (in this case indicating a transmit or receive state of port y) is asserted to port x as the BLOCK signal. Switch processing engine 100 maintains this configuration until port x is successful in transmitting to port y. Note that a CRS output of a port is not fed back to the BLOCK input of the same port. It is assumed that switch processing engine 100 takes appropriate action when the incoming packet on a port is physically addressed to itself, and hardware blocking will not be performed.

Figure 6:
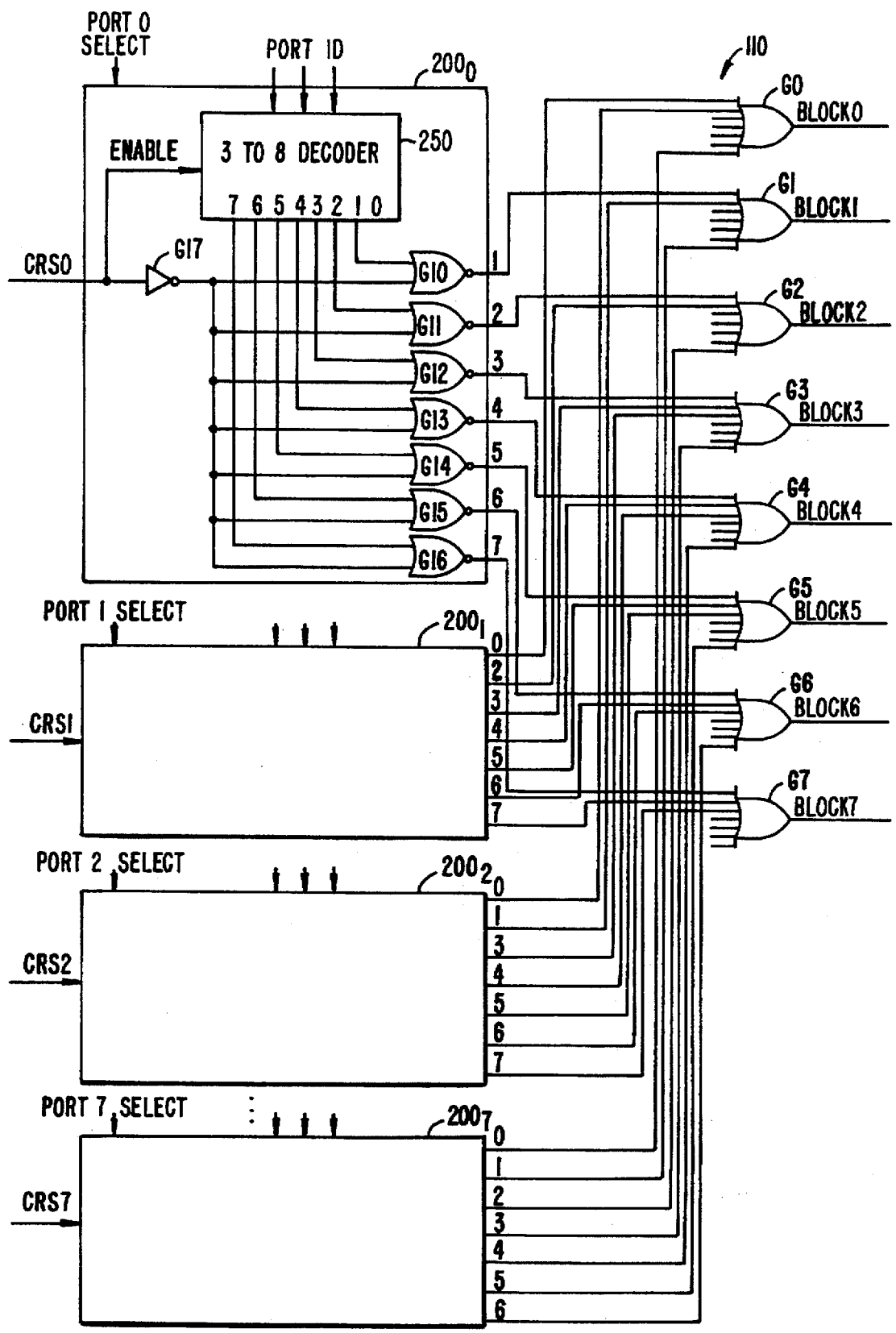
FIG. 6 is a detailed logic for switch fabric that supports backpressure and logical collision domain.

FIG. 6 is a detailed logic for a switch fabric that supports backpressure and logical collision domains. Phantom packet and Logical Collision domain controller 110 includes, for an eight port switch, eight port x receive packet destination decoder 200x (one per port) and eight blocking 7-input OR gates (G0–G7). Each decoder 200x receives CRSx from a MAC 115 and, in response to a decoded PORT ID signal identifying port y, asserts a decoder output signal DECODEy when CRSx is asserted. Corresponding DECODEy signals from decoder 200x (i.e., those that identify port y) are each provided to one input of the corresponding blocking OR gate Gy.

Each decoder 200x includes a 3-to-8 decoder 250, seven dual-input NOR gates (G10–G16) and an inverter G17. For decoder 200x, CRSx is input to inverter G17. An output of inverter G17 is coupled to a first input of each gate G10–G16. An output of NOR gates GX provides the DECODEy signal. The CRSx input is also provided to an enable input of decoder 250. Decoder 250, responsive to the PORT ID signal and assertion of the enable signal, converts a bit code identifying the active receiving port to an eight bit code. One of each of the bits of the converted PORT ID code is coupled to one of the second inputs of the NOR gates G10–G16.

For instance, if port 0 is an active receiver and the identified destination output port is port 7 (assume CRS7 is asserted), then when the value 0 is written to port 7 receive packet destination decoder $200_7$, CRS7 is routed at DECODE0 to blocking OR gate G0. When DECODE0 is active (e.g., active CRS7 routed to G0), BLOCK0 is asserted, and a phantom packet is transmitted into the collision domain coupled to port 0 for as long as CRS7 remains asserted.

Switch processing engine 100 is assumed to be able to read the appropriate Throttle Count values when two input ports are active and simultaneously (or closely separated in time) request access to the same output resource. Switch processing engine 100 would then choose the port with the highest Throttle Count to be allowed to occupy the output port, while the port with the lower Throttle Count value would have its port ID written to the Logical Collision domain controller for the associated output port.

The previous description has identified a half duplex flow control system, for use in a switch, where typically 10BASE-T, 10BASE-FL or FOIRL, and/or 100BASE-T4 link segments are used. The following description looks at the use of full duplex to interconnect such switches or provide access to devices that can benefit from full duplex operation, and the extensibility of the flow control mechanism to these environments.

Figure 7:
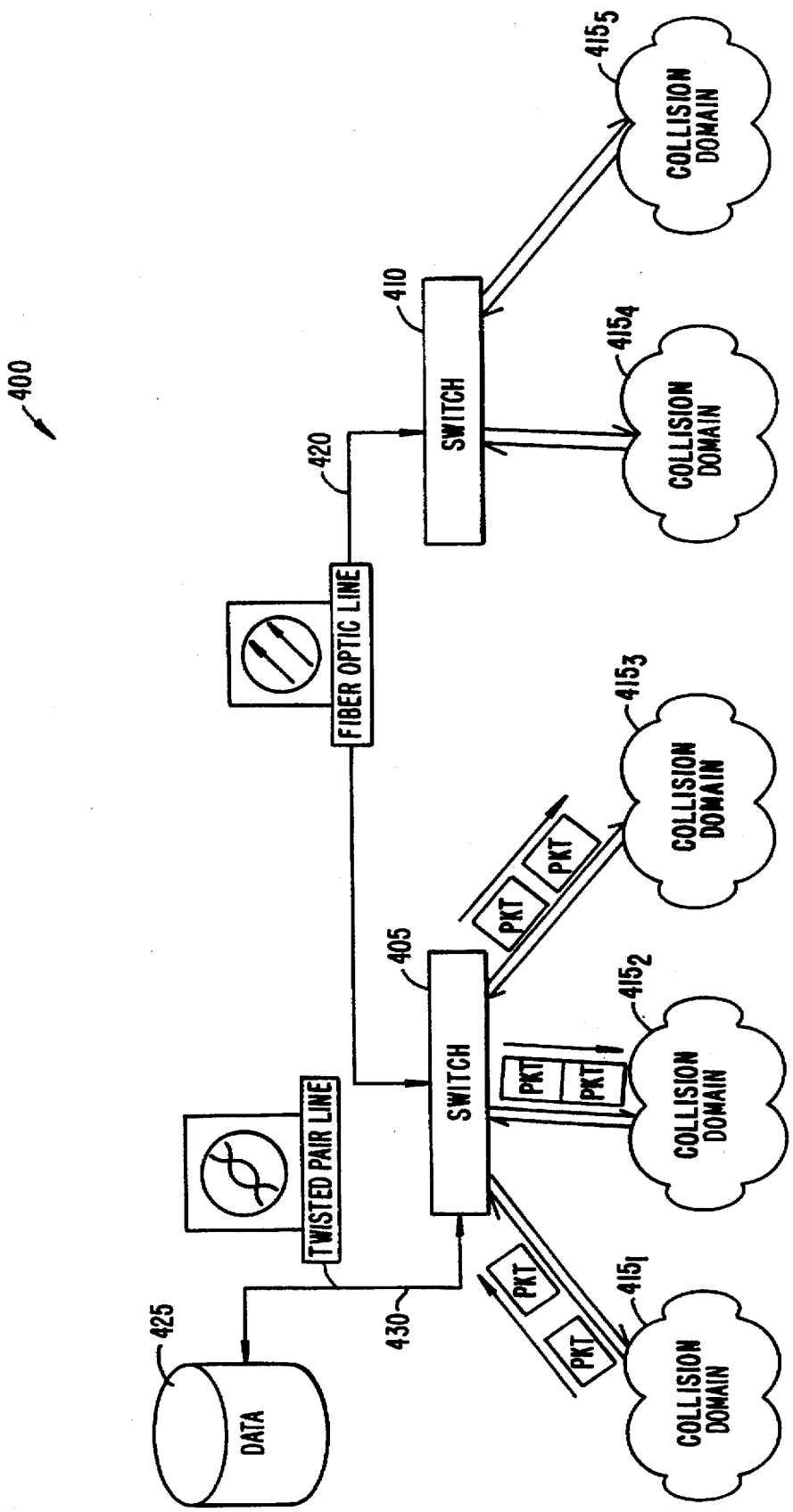
FIG. 7 is block diagram of a network switch including full-duplex parts.

FIG. 7 is a block diagram of network 400 incorporating a first network switch 405 and a second network switch 410, each switch having full-duplex ports and half-duplex ports. Network 400 incorporates several collision domains $415i$, each collision domain operating independently from the others, except when data packets are transferred between the collision domains.

There are many possible configurations for network 400, one of which is described below to simplify explanation of the preferred embodiment. Other configurations and orientations of network 400 are possible while still implementing the present invention. Network 400 provides for 10 Mb/s or 100 Mb/s half-duplex links between switch 405 and the collision domains coupled to it (i.e., collision domains $415_1$, $415_2$ and $415_3$), and switch 410 operates with 10 Mb/s or 100 Mb/s half-duplex links between it and collision domain $415_4$ and collision domain $415_5$. A Draft Supplement to 1993 version of ANSI/IEEE Std 802.3, Document #P802.3u/D5, MAC Parameters, Physical Layer, Medium Attachment Units and Repeater for 100 Mb/s Operation (Version 5.0), IEEE Standards Department, hereby expressly incorporated by reference for all purposes, defines one environment for 100 Mb/s operation. Implementing this standard has a drawback in that the physical separation of end-stations is limited (e.g., approximately 200 meters using the 100BASE-T draft).

To improve upon this physical cabling restraint, network 400 implements a full-duplex fiber-optic link 420 between switch 405 and switch 410. One implementation would be to use a full-duplex version of the 100BASE-FX environment (Clauses 26 and 27 of 100BASE-T Draft Supplement to 1993 version of ANSI/IEEE Standard 802.3, hereby expressly incorporated by reference for all purposes) having a physical link determined by signal attenuation (presently about a 2 kilometer limit). Thus switch 405 and switch 410 are able to exchange inter-collision domain packets across the fiber-optic link and avoid the physical limitations of the normal collision domain links.

In other instances, it is desirable for switch 405 to communicate with a database 425 (such as a server) using a full-duplex transmission protocol to improve performance and access to data by end-stations in any of the collision domains $415_i$. Switch 405 is coupled to database 425 by a 100 Mb/s full-duplex twisted pair link 430. One implementation for link 430 uses a full-duplex version of 100BASE-TX environment (Clauses 24 and 25 of 100BASE-T Draft Supplement to 1993 version of ANSI/IEEE Standard 802.3, hereby expressly incorporated by reference for all purposes) that provides the performance of full-duplex 100 Mb/s operation without the expense of fiber-optic cabling. With the operational speed of network 400, it is important to provide an efficient full-duplex flow control mechanism to control inter-collision domain packet transmissions. Also, having a mixture of half-duplex and full-duplex environments adds complexity to flow control mechanisms. The switch is also capable of incorporating full-duplex 10 Mb/s ports in addition to the 100 Mb/s ports.

For the possible 10 Mb/s systems, 10BASE-T uses a Link Test Pulse during periods of idle (no packet activity for a significant duration) to monitor that the end-to-end link is intact. 10BASE-FL (Fiber Link) and 10BASE-FB (Fiber Backbone) use an "active idle" signal, transmitting a 1 MHz or 2.5 MHz signal respectively. Both of these schemes are not well suited to encoding flow control data into the idle indicator, for reasons of speed of detection.

100BASE-T4 also uses Link Test Pulses in order to determine the end-to-end integrity of the link. Although 100BASE-T4 is not suitable for symmetrical 100 Mb/s full duplex operation, this is not to say that it is not a candidate for an asymmetric version of full duplex (such as transmitting 66 Mb/s and receiving 33 Mb/s nominally). In this case, like the 10BASE-T system, the Link Test pulses are not well suited for carrying real time flow control information, due the separation required between pulses, and the fact that multiple copies of the message may have to be transmitted to increase the noise robustness of the system.

Hence 10BASE-T, 10BASE-F and 100BASE-T4 systems appear better suited to the in-band flow control mechanism outlined previously. Namely, the creation of flow control packets, which contain an embedded indicator, such as a special SFD or data field, which allows the packet to be identified as carrying flow control information. Note that the packet may be well formed (with a valid CRC), and carry information in it, relevant to the subsequent performance expectations of the destination's transmitter. In this way, half duplex flow control can be provided by using the collision mechanism caused by phantom packet generation. Flow control for full duplex versions of 10BASE-T and 10BASE-FL can be configured to react to the phantom packet differently, and use the information embedded within the phantom packet to modify their transmit performance.

On the other hand, the 100BASE-TX and 100BASE-FX signaling schemes send continuous streams of characters regardless of whether data or idle information is being transmitted. This is a unique aspect of these technologies, and makes them both highly suitable to operating with the out-of-band signaling scheme mentioned previously. 100BASE-X (TX and FX) systems use a 4B/5B encoding technique, taking 4 bits of the data packet, and converting them to a 5 bit code-group that is actually transmitted over the medium. The inverse decoding technique re-maps the received 5 bit code-group to the 4 bit data field passed back to the MAC. In 100BASE-T systems, the standardized interface for passing the 4 bits of information between the MAC and the PHY is referred to as the Media Independent Interface (MII) and is referenced in Clause 22 of the 802.3u Draft Supplement.

In 100BASE-X, the PHY converts the 4 bits of binary data into the 5 bit code-groups transmitted over the medium, and vice-versa. For the 4 bits of data, there are clearly 16 possible combinations. Since a 5 bit code is available for the mapping, there are 32 possible combinations of code-groups. Although only 16 of the possible 32 combinations of code-groups are allocated for data bits, the remaining code-groups are used for special functions. For instance, the idle code-group (11111) is transmitted during the IPG, when essentially no data is being passed down from the MAC. In addition, some code-groups are reserved for control functions, for instance the "J" (11000) and "K" (10001) code-groups are used together to indicate the Start-of-Stream-Delimiter (SSD), identifying the transition from idle to frame data. The "T" (01101) and "R" (00111) code-groups are used together to indicate the End-of-Stream-Delimiter (ESD), identifying the transition from frame data to idle. The "H" code-group (00100) is used to indicate invalid data, and should only be transmitted under special error conditions. An additional 10 code-groups remain undefined at this time, all indicting invalid codes if received. These are defined in Table 24-1 of the previously referenced Clause 24 for 100BASE-X.

This allows the unused code-groups to be utilized to transmit flow control information. Not only can this be signaled within the Inter Packet Gap (IPG), but with careful choice of code-groups, it is also possible to signal flow control information within the packet data stream. This capability to signal within the data stream imposes additional delay (hence buffering) restrictions on the PHY, which in the case of 100BASE-TX may be significant since the delay budget of the network is already close to the limit, and provides minimal margin.

Utilizing some unused code-groups can allow simple and flexible flow control to be implemented. For instance, mapping code-groups to mean "XON', XOFF" allows a minimal code space to be used. An alternative, more flexible code-group allocation may be to assign one code-group as a "Flow Control Information Header". In this way, other code-groups could be assigned to mean "XON", "XOFF", "Delay Transmission for x time period", "Increase IPG by x period" etc.

The PHY is assumed to interpret these flow control code-groups, and pass them via the Reconciliation Sublayer and the MII to the MAC. In the case of simple XON/XOFF control, the assumption is that the PHY simply asserts collision to abort the packet transmission as indicated previously. Notice that an extension of this scheme, the PHY may in fact be used to "police" the Late Collision threshold itself. For instance, if the flow control indicator is received after the late collision threshold, the PHY buffers the indication, until the start of the next packet transmission. In this way, the next packet transmission experiences an apparent "in window" collision, and backs off normally (using whatever agreed upon backoff period is invoked when in the full duplex mode). These alleviates the problem of the transmitting MAC having to determine whether to corrupt the transmission, if the flow control/collision signal is received after the slot time, and the MAC intends to retry the same packet. Hence this minimizes the modifications necessary to the MAC between full and half duplex operation.

Clearly, the ability to transmit flow control information embedded with a packet offers advantages, in that the granularity of control of the remote station's transmit behavior can be more tightly controlled. For instance, the two following examples look at the type of latency that could be expected when attempting to use flow control within the IPG only.

IPG based flow control example:

A switch just commences transmission of a maximum length packet (1500 data bytes) to the full duplex station connected to a particular port.

Just after the switch commences transmission, it identifies it needs to send flow control (for instance, it is concurrently receiving a packet from the station and is running short of buffer resources).

The station finishes it's current transmission essentially at the same time that the switch starts it's own transmission.

The station has received no flow control information at this time (since there is a maximum length packet being transmitted), so the station's IPG timer expires and it transmits either:

(i) A maximum length packet (ii) Multiple minimum length (64 data bytes) packets (approx. 18 64 byte packets with minimum IPG can be transmitted during the time interval taken by a single 1500 byte packet)

(iii) Some number of packets of intermediate length (packet with >64 and <1500 data bytes)

Once the switch completes the maximum length packet, it issues the flow control message to the station in the IPG.

If the flow control information arrives at the station before the station reaches the 512 bit time threshold on it's next packet transmission, the transmission will be aborted. If the flow control information arrives later than the "in-window" collision time, the packet will complete, and the subsequent packet will be delayed or suspended.

From this it can be seen that if the end-to-end delay of the link is (nominally) less than the 512 BT slot time, the switch must be capable of buffering either one maximum length packet, or up to 18 minimum length packets. If the flow control information arrives after the slot time window, the switch must be capable of buffering up to 2 maximum length packets, or 19 packets, where 1 packet may be either minimum or maximum length.

Flow control within the packet would therefor allow the switch to substantially reduce the buffering requirements, allowing a potentially more cost effective implementation.

When more sophisticated signaling is used, such as outlined above, this information (such as a flow control code-group to delay transmission for a specified time) would have to be supplied over the RXD<3:0> lines of the MII, with both the COL line asserted, the RX_DV line de-asserted, the RX_ER line asserted, and one of the following code assigned to RXD<3:0>, 0001 through 1101, or 1111 (the code 1110 is reserved for False Carrier indication when the RX_DV line is de-asserted and the RX_ER line is asserted). Using this mechanism, additional information can effectively be passed to the MAC, or a management entity, to modify the re-transmission behavior of the MAC.

The fact that the end-to-end delay on a full duplex link can become longer than the slot time, due simply to the delay taken for the packet to propagate the extended distance, can lead to potential problems, which should be avoided. For instance, in a situation where the packet is retried by the end-station, the switch should not duplicate the packet. A good example here is the transmission of a minimum size frame. This has only 64 bytes, plus 64 bits of preamble, leading to a packet size of 576 bit times. Assuming the switch sends the flow control signal, which reaches the end station at bit time 511, there is a possibility that the end station could complete the frame transmission, and reschedule the transmission. Since the switch will have no indication as to the exact point that the end-station received the flow control signal, when the packet is retransmitted, the switch could receive a duplicate of the previous packet. There are several potential solutions to this:

(a) Extend the window that the flow control signal must be received in. In this way, it can be guaranteed that when the flow control signal is sent, it will always cause a retransmission, so the currently received packet can always be discarded by the switch. This had the disadvantage that the retry window becomes large, and the packet may have to be completely reloaded into the end-station controller, degrading bus bandwidth utilization.

(b) Only allow flow control to take effect during IPG. In this way, a device that has received a flow control frame will always complete the current transmitted packet successfully, but will add a substantially larger IPG before transmitting the next packet. Using this mechanism, no re-tries would be necessary. The disadvantage here is that the switch is forced to buffer the current packet.

(c) Guarantee that receipt of the flow control packet within the window will cause a transmitted packet from the end-station to have an invalid FCS. This will cause the switch or the eventual destination to discard the frame on receipt. The end-station controller must corrupt the transmitted packet if it schedules a retry, and must deliver the packet normally if the flow control request is received after the permitted window.

(d) Guarantee that the flow control information can reach the target device before the 512 BT limit. This essentially limits the one way trip delay of the link to be 511 bit times, which may be undesirable.

(e) Use the PHY to "police" the Late Collision threshold. For instance, if the flow control indicator is received after the late collision threshold, the PHY will buffer the indication, until the start of the next packet transmission. In this way, the next packet transmission experiences an apparent "in window" collision, and backs off normally (using what ever agreed upon backoff period is invoked when in the full duplex mode). This alleviates the problem of the transmitting MAC having to determine whether to corrupt the transmission, if the flow control/collision signal is received after the slot time, and the MAC intends to retry the same packet. Hence this minimizes the modifications necessary to the MAC between full and half duplex operation.

In summary, the algorithm has two possible derivatives, as outlined below:
1. Retry Based
   End-station transmits
   Switch transmits flow control signal (phantom packet or code-group)
   End-station receives flow control signal
   End-station corrupts transmission and re-schedules attempt
   End-station waits (for elapsed time or "resume" signal)
   End-station retries
2. Delay Based
   End-station transmits
   Switch transmits flow control signal (phantom packet or code-group)
   End-station receives flow control signal
   End-station completes transmission
   End-station waits (for elapsed time or "resume" signal)
   End-station sends next packet An alternative to the Retry based algorithm specific to the 100BASE-X based networks is:
3. Retry Based (100BASE-X)
   End-station transmits
   Switch transmits flow control signal
   End-station receives flow control signal
   PHY determines "in window" or "out-of-window" flow control
   If "in-window", PHY applies flow control
   If "out-of-window" PHY delays flow control until next transmission attempt
   End-station aborts transmission and re-schedules attempt
   End-station waits (for elapsed time or "resume" signal)
   End-station retries Another consideration which applies to the three versions of the algorithm is the effect of receipt of a flow control signal by the end-station when it is not currently transmitting. Two obvious choices can be considered, in that a wait period can be scheduled, or no action taken. It is preferable that a wait period be scheduled before the next transmission. This allows for the fact that a flow control request may have been generated as a result of a previous packet, but due to propagation delay, may arrive after the packet has completed.

From the above, it appears that the Retry Based scheme is well suited to an in-band signaling scheme (phantom packet) or an out-of-band scheme (code- group), since it requires a fast detection of the flow control signal (i.e., within the slot time). In addition, this scheme offers advantages such as applicability to half as well as full duplex, and the fact that the flow control signal can essentially be "piggy-backed" in a normal data format packet (such as by using a special preamble/SFD sequence or code group). This scheme allows minimal buffering in the switch since it can operate with no buffers available. The Delay Based scheme would work well for out-of-band as well as in-band signaling, but it does require the switch to offer some minimal buffering capability (i.e. be capable of receiving the packet currently being transmitted, as well as take account of the potential delay to ensure delivery of the flow control packet to the destination station), unless the detection/signaling of resource limitations can be executed within the slot time (which may not be practical due to propagation delay alone).

In conclusion, the present invention provides a simple, efficient solution to a problem of flow control in an Ethernet switch with half-duplex and/or full-duplex ports. While the above is a complete description of the preferred embodiments of the invention, various alternatives, modifications, and equivalents may be used. Therefore, the above description should not be taken as limiting the scope of the invention which is defined by the appended claims.

What is claimed is:

1. A method of switching an input data packet received at a first port of a network switch to a second port of the switch having an communication channel established between the second port and a third port of the switch, comprising the steps of:

determining whether to block the input data packet; thereafter applying a full-duplex backpressure indicator to the first port when blocking is desired;

responding, by a transmitter coupled to the input of the first port that is transmitting the input data packet, to said backpressure indicator to abort transmission of the input data packet; and thereafter receiving a retransmitted input data packet at the first port when the second port is available; and thereafter routing the input data packet from the first port to the second port.

2. The switching method of claim 1 wherein said backpressure applying step further comprises the steps of:

forming a flow control packet which is recognized as a flow control event by a full-duplex receiver coupled to the first port and which triggers a collision condition in a half-duplex receiver coupled to the first port; and thereafter transmitting said flow control packet from the first port.

3. A method of switching an input data packet received at a first port of a network switch to a second port of the switch having an communication channel established between the second port and a third port of the switch, comprising the steps of:

determining whether to block the input data packet; thereafter applying a full-duplex backpressure indicator to the first port when blocking is desired;

responding, by a transceiver coupled to the input of the first port that is transmitting the input data packet, to said backpressure indicator to cause said transceiver to invalidate the input data packet; and thereafter receiving a retransmitted input data packet at the first port when the second port is available; and thereafter routing the input data packet from the first port to the second port.

4. The switching method of claim 3 wherein said applying step includes a step of inserting said indicator into an output data packet transmitted from the first port concurrently with receipt of the input data packet at the input of the first port.

5. The switching method of claim 3 wherein said transceiver includes a timer for asserting a retransmit signal after a predetermined time delay, the method further comprising the steps of:

starting said timer upon receipt of said backpressure indicator; and thereafter initiating retransmission of the input data packet subsequent to assertion of said retransmit signal by said timer.

6. A method of switching an input data packet received at an input of a first port of a full-duplex network switch to an output of a second port of the switch having an communication channel established between the output of the second port and an input of a third port of the switch while an output data packet is transmitted from an output of the first port, the method comprising the steps of:

determining whether to block the input data packet; thereafter transmitting a backpressure indicator from the first port when blocking is desired;

aborting transmission of the input data packet by a transceiver coupled to the first port in response to said backpressure indicator; thereafter receiving the input data packet at the first port when the output of the second port is available; and thereafter routing the input data packet from the first port to the second port.

7. The switching method of claim 6 wherein said backpressure transmitting step inserts said backpressure indicator into the output data packet transmitted from the first port to said transceiver.

8. A transceiver comprising:

means for receiving a flow control message within a specified first time period;

means for passing said flow control message across an MII-type interface immediately, but on receiving said flow control message after said specified first time period;

means for delaying transfer of said flow control message across the MII-type interface.

9. The transceiver of claim 8 wherein the specified time is a 512 bit time collision window.

10. The transceiver of claim 9 wherein the specified time may be programmed or jointly negotiated to a different value.

11. A method of switching a second input data packet received at a first port of a network switch, after a first input data packet, to a second port of the switch having an communication channel established between the second port and a third port of the switch, comprising the steps of:

determining, during transmission of the first input data packet, whether to block the second input data packet; thereafter applying a full-duplex backpressure indicator, during transmission of the first input data packet, to the first port when blocking is desired;

responding, by a transmitter coupled to the input of the first port that is transmitting the input data packets, to said backpressure indicator to invalidate and suspend transmission of the second input data packet; and thereafter receiving a retransmitted second input data packet at the first port when the second port is available; and thereafter routing the second input data packet from the first port to the second port.

12. A method of switching a second input data packet received at a first port of a network switch, after a first input data packet, to a second port of the switch having an communication channel established between the second port and a third port of the switch, comprising the steps of:

determining, during transmission of the first input data packet, whether to block the second input data packet; thereafter applying a full-duplex backpressure indicator, after transmission of the first input data packet but prior to transmission of the second input data packet, to the first port when blocking is desired;

responding, by a transmitter coupled to the input of the first port that is transmitting the input data packets, to said backpressure indicator to suspend transmission of the second input data packet; and thereafter receiving the second input data packet at the first port when the second port is available; and thereafter routing the second input data packet from the first port to the second port.

13. A full duplex capable Ethernet device, comprising:
means for producing flow control information; and
means for transmitting flow control information to a remote device using an Ethernet packet format conforming to the IEEE 802.3 standard.

14. The Ethernet device of claim 13 where the packet contains embedded flow control information, using either a special preamble, SFD or message data format.

15. A full duplex capable Ethernet device, comprising:
means for producing flow control information; and
means for transmitting flow control information to, or receiving flow control information from, a remote device using a unique encoded pattern.

16. The controller of claim 15 where the pattern may be a multiple of code-groups.

17. The controller of claim 15 where the pattern may be transmitted during the IPG.

18. The controller of claim 15 where the pattern may be transmitted during the IPG or the packet data.

19. The controller of claim 16 where the code-groups are interpreted as different messages.

20. The controller of claim 19 where a special code-group is interpreted as a "stop transmitting" indicator.

21. The controller of claim 19 where a special code-group is interpreted as a "start transmitting" indicator.

22. The controller of claim 19 where a special code-group is interpreted as a "modify IPG time" indicator.

23. The controller of claim 19 where a special code-group is interpreted as a "modify backoff interval" indicator.

24. The controller of claim 19 where a special code-group is interpreted as a "modify slot time interval" indicator.

25. The transceiver of claim 8 which passes special data fields over the RXD<3:0> lines of the MII-type interface to indicate special flow control related encodings.

26. A full duplex Ethernet compatible controller operating method for transmitting and receiving data packets concurrently, comprising the steps
transmitting a packet while simultaneously receiving a packet;
detecting assertion of a flow control indication; and
aborting the transmission attempt and re-scheduling the attempt after a random computed value.

27. The controller of claim 26 where the random computed time is a multiple of the slot time.

28. The controller of claim 26 where the random computed time is a multiple of a pre-defined time other than the slot time.

29. A method of switching an input data packet received at a first port of a network switch to a second port of the switch having an communication channel established between the second port and a third port of the switch, comprising the steps of:
determining whether to block the input data packet; thereafter
applying a full-duplex backpressure indicator to the first port when blocking is desired, including the step of transmitting said indicator in an inter-packet gap following an output data packet transmitted from the first port concurrently with receipt of the input data packet;
responding, by a transceiver coupled to the input of the first port that is transmitting the input data packet, to said backpressure indicator to cause said transceiver to invalidate the input data packet; and thereafter
receiving a retransmitted input data packet at the first port when the second port is available; and thereafter
routing the input data packet from the first port to the second port.

30. A method of switching an input data packet received at a first port of a network switch to a second port of the switch having an communication channel established between the second port and a third port of the switch, comprising the steps of:
determining whether to block the input data packet; thereafter
applying a full-duplex backpressure indicator to the first port when blocking is desired;
responding, by a transceiver coupled to the input of the first port that is transmitting the input data packet, to said backpressure indicator to cause said transceiver to invalidate the input data packet; and thereafter
receiving a retransmitted input data packet at the first port when the second port is available; and thereafter
routing the input data packet from the first port to the second port;
wherein said backpressure indicator includes a backoff duration, the method further comprising the steps of:
extracting said backoff duration from said backpressure indicator; and thereafter
retransmitting the input data packet after said backoff duration.

31. A method of switching an input data packet received at a first port of a network switch to a second port of the switch having an communication channel established between the second port and a third port of the switch, comprising the steps of:
determining whether to block the input data packet; thereafter
applying a full-duplex backpressure indicator to the first port when blocking is desired;
responding, by a transceiver coupled to the input of the first port that is transmitting the input data packet, to said backpressure indicator to cause said transceiver to invalidate the input data packet; and thereafter
receiving a retransmitted input data packet at the first port when the second port is available; and thereafter
routing the input data packet from the first port to the second port;
wherein the method further comprises the steps of:
transmitting, from the first port to said transceiver, a resume signal; and thereafter
responding, by said transceiver, to retransmit the input data packet to the first port.

32. The switching method of claim 31, wherein when said resume signal is not received after a predetermined delay, an end-station resumes transmission after said predetermined time.

33. A method of switching an input data packet received at an input of a first port of a full-duplex network switch to an output of a second port of the switch having an communication channel established between the output of the second port and an input of a third port of the switch while an output data packet is transmitted from an output of the first port, the method comprising the steps of:
determining whether to block the input data packet; thereafter
transmitting a backpressure indicator from the first port when blocking is desired;
aborting transmission of the input data packet by a transceiver coupled to the first port in response to said backpressure indicator; thereafter receiving the input data packet at the first port when the output of the second port is available; and thereafter routing the input data packet from the first port to the second port;

wherein said backpressure transmitting step transmits said backpressure indicator after the output data packet transmitted from the first port to said transceiver.

34. A method of switching a second input data packet received at a first port of a network switch, after a first input data packet, to a second port of the switch having an communication channel established between the second port and a third port of the switch, comprising the steps of:

determining, during transmission of the first input data packet, whether to block the second input data packet; thereafter applying a full-duplex backpressure indicator, after transmission of the first input data packet but prior to transmission of the second input data packet, to the first port when blocking is desired;

responding, by a transmitter coupled to the input of the first port that is transmitting the input data packets, to said backpressure indicator to suspend transmission of the second input data packet; and thereafter receiving the second input data packet at the first port when the second port is available; and thereafter routing the second input data packet from the first port to the second port wherein said back-pressure indicator includes a SA/DA field that defines a particular packet to be retransmitted.

35. A method for operating a full duplex Ethernet compatible controller that transmits and receives data packets concurrently, comprising the steps of:

transmitting a first packet while simultaneously receiving a second packet;

detecting assertion of a flow control indication; and thereafter aborting transmission of the first packet in response to the flow control indication and rescheduling transmission of the first packet after a defined period.

36. The method of claim 35 wherein the defined period is defined by the flow control indication.

37. The method of claim 36 wherein the flow control indication indicates a particular number of IPGs to wait before retransmission of the first data packet.

38. The method of claim 36 wherein the flow control indication indicates a particular number of IPGs to wait between subsequently transmitted packets.

39. The method of claim 36 wherein the flow control indication indicates a particular number of slot times to wait before retransmission.

* * * * *